Patented Apr. 3, 1945

2,372,663

UNITED STATES PATENT OFFICE 2,372,663

ANTHRAQUINONE COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application July 18, 1941,
Serial No. 403,000

9 Claims. (Cl. 260—345)

This invention relates to anthraquinone compounds and their application for the coloration of textile materials, particularly organic derivative of cellulose textile materials, by dyeing, printing, stenciling or like methods. The invention includes the new anthraquinone compounds, the process for their preparation, the process of dyeing or coloring therewith and textile materials colored with the new anthraquinone compounds of the invention.

It is an object of our invention to provide a new class of anthraquinone compounds. A further object of our invention is to provide colored textile materials which are of good fastness to light and washing. A specific object is to produce dyeings on organic derivative of cellulose and particularly cellulose acetate silk textile material which are of good fastness to light and washing. Another object is to provide a satisfactory process for the dyeing or coloring of textile materials. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The anthraquinone compounds by means of which the above named objects are accomplished or made possible are characterized in that they contain a

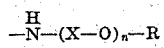

group, wherein X stands for a saturated low carbon hydrocarbon radical, $n$ stands for a small whole positive number and R stands for a member selected from the group consisting of a phenyl and an α-furfuryl radical, attached to an alpha position of the anthraquinone nucleus.

The anthraquinone compounds of our invention can contain other substituents in addition to the grouping just defined. Illustrative substituents which can be present in an α-position include the hydroxy group, a halogen atom, an alkoxy group, an amino group, an aliphaticamino group, a cycloalkylamino group, a phenylamino group, an aralkylamino group, a furfurylamino group and a

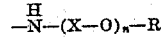

group, wherein R, X and $n$ have the meaning assigned to them. Substituents which can be present in a β-position include, for example, a halogen atom, a cyano group, a carboxyl group, a hydroxy group, a sulfonic acid group and a carboxamide group.

The term "aliphatic" as used herein includes not only unsubstituted alkyl groups such as a methyl group, an ethyl group, a propyl group or a butyl group but also substituted alkyl groups such as β-hydroxyethyl, β-hydroxypropyl, β,γ-dihydroxypropyl, γ-hydroxypropyl, β-methoxyethyl, β-ethoxyethyl, β-sulfatoethyl, β-sulfopropyl, γ-sulfopropyl and β-phosphatoethyl, for example. The term "aliphatic" further includes unsaturated hydrocarbon groups such as allyl and crotonyl. Illustrative alkoxy groups include methoxy, ethoxy, propoxy, β-methoxyethoxy, and β-ethoxyethoxy. Illustrative of cycloalkyl may be mentioned cyclohexyl, cyclopentyl and cyclobutyl. Representative aralkyl groups include, for example, benzyl and phenylethyl while representative of halogen may be mentioned bromine and chlorine. Similarly, the term "a phenyl" includes not only the unsubstituted phenyl radical but also phenyl radicals substituted, for example, with a nitro group, a halogen atom, an alkoxy group, or an alkyl group such as methyl or ethyl. The term "a furfuryl group" includes the furfuryl radical, alkylated furfuryl radicals, the tetrahydrofurfuryl radical and alkylated tetrahydrofurfuryl radicals. Illustrative of such radicals are 5-ethylfurfuryl, 5-β-hydroxyethylfurfuryl, tetrahydrofurfuryl, and 5-ethyltetrahydrofurfuryl.

While our invention relates broadly to the anthraquinone compounds above described, it relates more particularly to the anthraquinone compounds having the general formula:

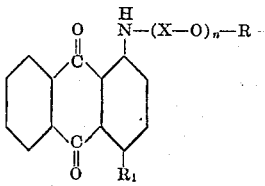

wherein X stands for a saturated low carbon hydrocarbon radical, $n$ stands for a small whole positive number, R stands for a member selected from the group consisting of a phenyl and an α-furfuryl radical and $R_1$ represents a member selected from the group consisting of hydrogen, a halogen atom, an alkoxy, an amino, a hydroxy, an aliphaticamino, a cycloalkylamino, an aralkylamino, a phenylamino, a furfurylamino and a

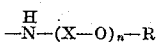

group, wherein R, X and $n$ have the meaning previously assigned to them. Compounds wherein $R_1$ is an aliphaticamino group and R is an α-furfuryl, particularly an α-tetrahydrofurfuryl group are, as a general rule, advantageous.

The anthraquinone compounds of our invention constitute valuable dyes for the dyeing or coloration of organic derivatives of cellulose, wool, silk, nylon and Vinyon textile materials yielding for the most part blue, violet and green-blue shades of generally good fastness to light and washing. They are especially adapted for the dyeing of cellulose acetate silk. For the dyeing of organic derivatives of cellulose and Vinyon non-sulfonated dyes should be employed. Sulfonated dye compounds can be obtained by sulfonation of the unsulfonated compounds in accordance with known methods for the introduction of a sulfonic acid group into anthraquinone compounds. Both the sulfonated and the unsulfonated compounds possess application for the coloration of wool, silk and nylon.

The anthraquinone compounds of our invention, generally speaking, can be prepared by condensing a suitable leuco anthraquinone with an amine having the general formula:

wherein X, $n$ and R have the meaning previously assigned to them. The exact method of preparation varies considerably depending upon the particular compound desired.

Suitable leuco anthroquinones which can be employed in the preparation of the compounds of our invention include leuco quinizarin, leuco-1,4,5,8 - tetrahydroxy anthraquinone, leuco-1,4,5-trihydroxy anthraquinone, leuco-1,4-diaminoanthraquinone and leuco-1-aminoanthraquinone. As will be apparent from the examples given hereinafter, mixtures of leuco anthraquinones and non-leuco anthraquinones can be employed.

One or more groups characterizing the compounds of our invention can be present. Where more than one such group is present, they can be the same or different. Frequently it is desirable that another amino group be present and in such a case the reaction may be carried out using a mixture of amines or each amine may be separately condensed with the leuco anthraquinone compound.

We would here note that we have discovered that certain dye mixtures consisting of compounds of our invention are particularly advantageous. In general, these dye mixtures are obtained by condensing leuco quinizarin or a mixture of leuco quinizarin and quinizarin with a mixture of amines in which one of the amines is predominant. To illustrate, if leuco quinizarin is condensed with a mixture of methylamine and tetrahydrofurfuryloxyethylamine in the ratio of 7 mole parts of methylamine to 3 parts of tetrahydrofurfuryloxyethylamine, a desirable dye mixture is obtained. Again, we have found that if a mixture of amines containing 4 mole parts of methylamine to one mole part of tetrahydrofurfuryloxy - β - ethoxyethylamine is condensed with leuco quinizarin, a particularly desirable dye mixture is obtained. Dye mixtures of the character just illustrated have increased melting points and possess the advantages of being more easily prepared into dispersible mixtures, of dispersing more readily, and of having less tendency to conglomerate in the dyebath. By being more readily despersible and having less tendency to conglomerate, evenness of dyeing, a very important factor in dyeing, is promoted. The preparation of the advantageous dye mixtures mentioned above is described completely hereinafter.

The condensation reactions referred to above may be carried out in water or in the presence of an inert solvent diluent such as ethanol, butanol or pyridine. The leuco dye compounds formed by the condensation reactions may be oxidized with air or other suitable oxidizing agent such as sodium perborate or sodium chlorate, for example, in known fashion to obtain the desired dye compound.

The following examples illustrate the preparation of the anthraquinone compounds of our invention.

*Example 1*

24 grams of leuco quinizarin, 150 cc. of butanol and 30 grams of β-furfuryloxyethylamine are heated together under refluxing conditions until no further color change takes place. Upon completion of the reaction (about 6 hours), the reaction mixture is poured into water and oxidized with sodium perborate in known fashion. The dye compound formed is recovered by filtration, washed with water and dried. 1,4-di-(mono-β-furfuryloxyethylamino) - anthraquinone having the formula:

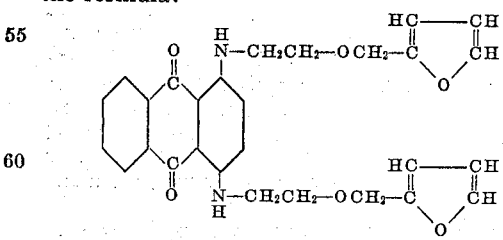

is obtained. It colors cellulose acetate silk blue.

32 grams of β - tetrahydrofurfuryloxyethylamine can be substituted for the β-furfuryloxyethylamine of the above example to obtain 1,4-di - (mono - β - tetrahydrofurfuryloxyethylamine)-anthraquinone which colors cellulose acetate silk blue.

*Example 2*

12 grams of leuco quinizarin, 12 grams of quinizarin, 150 cc. of butanol and 13.8 grams of β-phenoxyethylamine are heated together under refluxing conditions. Upon completion of the reaction (when no further color change takes place), the reaction mixture is poured into water and oxidized with an oxidizing agent such as sodium perborate, sodium chlorate, hydrogen peroxide or manganese dioxide. The dye compound formed is recovered by filtration, washed with water and dried. 1-mono-β-phenoxyethylamino - 4 - hydroxyanthraquinone having the formula:

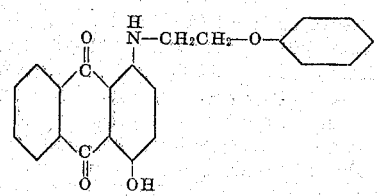

is obtained. It colors cellulose acetate silk violet.

By employing 30 grams of β-phenoxyethylamine in the above reaction and carrying out the refluxing operation until no further color change takes place 1,4 - di - (mono - β - phenoxyethylamino)-anthraquinone, which colors cellulose acetate silk blue is obtained.

*Example 3*

24 grams of leuco quinizarin, 150 cc. of butanol, 20 grams of β-tetrahydrofurfuryloxy-β-ethoxyethylamine and 11.5 grams of paraphenylenediamine are heated together under refluxing conditions until no further color change takes place. Upon completion of the reaction which takes place, the reaction mixture is poured into water and oxidized with sodium perborate in known fashion. The dye compound formed is recovered by filtration, washed with water and dried. 1-mono - β - tetrahydrofurfurloxy-β-ethoxyethylamino - 4-(4'-amino)-phenylamino-anthraquinone having the formula:

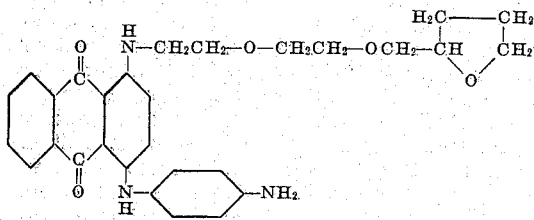

is obtained. The dye compound of this example colors cellulose acetate silk green-blue.

*Example 4*

12 grams of leuco quinizarin, 12 grams of quinizarin, 200 cc. of pyridine and 16 grams of β-tetrahydrofurfuryloxyethylamine are heated together under refluxing conditions until no further color change takes place. The reaction mixture is worked up as described in Example 1. 1-mono-β - tetrahydrofurfuryloxyethylamino - 4 - hydroxyanthraquinone is obtained. This dye compound colors cellulose acetate silk violet.

By the substitution of 18.8 grams of 5-ethyl-β-tetrahydrofurfuryloxyethylamine for the β-tetrahydrofurfuryloxyethylamine of the example 1-mono - 5 - ethyl - β - tetrahydrofurfuryloxyethylamino - 4 - hydroxyanthraquinone is obtained. This dye compound colors cellulose acetate silk violet.

*Example 5*

24 grams of leuco quinizarin, 16 grams of β-tetrahydrofurfuryloxyethylamine, 6.8 grams of ethanolamine and 150 cc. of butanol are refluxed together until no further color change takes place. By working up the reaction mixture in accordance with the procedure described in Example 1 1 - mono - β - tetrahydrofurfuryloxyethylamino- 4 - β - hydroxyethylamino - anthraquinone is obtained. This dye compound colors cellulose acetate silk blue.

Similarly, 17.4 grams of gamma tetrahydrofurfuryloxypropylamine, 6.8 grams of ethanolamine, 24 grams of leuco quinizarin and 150 cc. of butanol can be reacted together to obtain 1-mono-γ-tetrahydrofurfuryloxypropylamino - 4 - β - hydroxyethylamino-anthraquinone. This dye compound colors cellulose acetate silk blue.

*Example 6*

28 grams of β-(4'-sulfophenoxy)-β-ethoxyethylamine, 10 grams of aniline, 24 grams of leuco 1,4-diaminoanthraquinone and 150 cc. of butanol are refluxed together until no further color change takes place. Upon working up the reaction mixture in accordance with the procedure described in Example 1, 1-mono-β-(4'-sulfophenoxy) - β - ethoxyethylamino - 4 - monophenylaminoanthraquinone is obtained. This dye compound colors wool and silk blue.

By the substitution of an equivalent gram molecular weight of methylamine, ethylamine, propylamine or butylamine for aniline in the above reaction, the corresponding aminoanthraquinone dye compounds in which the monophenylamino group is replaced by a methylamino, an ethylamino, a propylamino or a butylamino group are obtained. These dye compounds color wool and silk blue.

*Example 7*

27 grams of 1,4-dimethoxyanthraquinone, 14.2 grams of β-furfuryloxyethylamine and 150 cc. of butanol are heated together under refluxing conditions until no further color change takes place. Upon working up the reaction mixture as described hereinbefore 1-mono-β-furfuryloxyethylamino - 4 - methoxyanthraquinone is obtained. This dye compound colors cellulose silk violet.

By the substitution of 15.2 grams of gamma phenoxypropylamine for the β-furfuryloxyethylamine of the above example 1-mono-γ-phenoxypropylamino - 4 - methoxyanthraquinone is obtained. This dye compound colors cellulose acetate silk violet.

*Example 8*

12 grams of leuco quinizarin, 12 grams of quinizarin, 200 cc. of pyridine, 15 grams of β-furfuryloxyethylamine and 16 grams of β-tetrahydrofurfuryloxyethylamine are heated together under refluxing conditions until no further color change takes place. Upon working up the reaction mixture 1-mono-β-furfuryloxyethylamino - 4 - mono-β - tetrahydrofurfuryloxyethylaminoanthraquinone is obtained. This dye compound colors cellulose acetate silk blue.

By the substitution of 13.8 grams of β-phenoxyethylamine, 10 grams of cyclohexylamine and 11 grams of benzylamine, respectively, for the β-tetrahydrofurfuryloxyethylamine of the above example, the corresponding aminoanthraquinone compounds in which the mono-β-tetrahydrofurfuryloxyethylamino group is replaced by a β-phenoxyethylamino, a cyclohexylamino and a benzylamino group, respectively, are obtained. These dye compounds color cellulose acetate silk blue.

*Example 9*

24 grams of leuco quinizarin, 16.6 grams of β-phenoxy-β-ethoxyethylamine, 6 grams of allylamine and 200 cc. of butanol are heated together under refluxing conditions until no further color change takes place. Upon working up the reaction mixture 1-mono-β-phenoxy-β-ethoxyethylamino-4-monoallylaminoanthraquinone is obtained. This dye compound colors cellulose acetate silk blue.

By the substitution of 20 grams of β-tetrahydrofurfuryloxy-β-ethoxyethylamine for the β-phenoxy-β-ethoxyethylamine of the above example, 1-mono-β-tetrahydrofurfuryloxy-β-ethoxyethylamino-4-monoallylamino anthraquinone which colors cellulose acetate silk blue is obtained.

By the substitution of 7.2 grams of crotonylamine for the allylamine of the examples just given, 1-mono-β-phenoxy-β-ethoxyethylamino-4-monocrotonylaminoanthraquinone and 1-mono-β-tetrahydrofurfuryloxy-β-ethoxyethylamino-4-monocrotonylaminoanthraquinone, respectively, can be obtained. These dye compounds color cellulose acetate silk blue.

*Example 10*

28 grams of leuco 1,4-dichloroanthraquinone, 14.2 grams of β-furfuryloxyethylamine and 150 cc. of butanol are heated together under refluxing conditions until no further color change takes place. Upon working up the reaction mixture, 1-mono-β-furfuryloxyethylamino-4-chloroanthraquinone is obtained. This dye compound colors cellulose acetate silk rubine.

*Example 11*

27.4 grams of leuco 1,4,5,8-tetrahydroxyanthraquinone, 200 cc. of butanol and 32 grams of β-tetrahydrofurfuryloxyethylamine are heated together under refluxing conditions until no further color change takes place. Upon working up the reaction mixture 1,4-di-(mono-β-tetrahydrofurfuryloxyethylamino)-5,8-dihydroxyanthraquinone is obtained. This dye compound colors cellulose acetate silk blue-green.

By the use of 48 grams of β-tetrahydrofurfuryloxyethylamine in the above reaction 1,4,5-tri-(mono-β-tetrahydrofurfuryloxyethylamino)-8-hydroxyanthraquinone is obtained. This dye compound colors cellulose acetate silk blue-green.

*Example 12*

27.4 grams of leuco-1,4,5,8-tetrahydroxyanthraquinone, 32 grams of β-tetrahydrofurfuryloxyethylamine and 200 cc. of butanol are heated together under refluxing conditions until no further color change takes place. 3.2 grams of methylamine are then added to the reaction mixture which is refluxed until no further color change takes place. Upon working up the reaction mixture 1,4-di-(mono-β-tetrahydrofurfuryloxyethylamino-5-mono-methylamino-8-hydroxyanthraquinone, which colors cellulose acetate silk blue-green is obtained.

By the substitution of an equivalent gram molecular weight of ethylamine, ethanolamine, β-hydroxypropylamine, β-methoxyethylamine, gamma hydroxypropylamine, aniline, benzylamine, and β-phenoxyethylamine for methylamine in the reaction just described, the corresponding aminoanthraquinone compounds in which the methylamino group is replaced by an ethylamino, a β-hydroxyethylamino, a β-hydroxypropylamino, a β-methoxyethylamino, a gamma hydroxypropylamino, a phenylamino, a benzylamino and a β-phenoxyethylamino group, respectively are obtained. These dye compounds color cellulose acetate silk blue-green.

*Example 13*

To a mixture of 1.94 grams of leuco quinizarin, 3.35 grams of 86% quinizarin and 0.35 gram of sodium bicarbonate was added a mixture of 1.83 grams of β-tetrahydrofurfuryloxyethylamine and 2.73 grams of 33.3% methylamine in 20 cc. of butanol. The reactants were refluxed 8 hours following which the leuco anthraquinone mixture formed was oxidized by adding 3 cc. of H2O and 1.85 grams of NaBO3—4H2O portionwise to the hot mixture and refluxing with shaking for one hour. Following this the reaction mixture was poured into 1½ liters of hot water, stirred and the precipitated dye mixture was recovered by filtration, washed with water and dried. A yield of 5.75 grams (84.4%) was obtained. The dye product obtained corresponds to the formula:

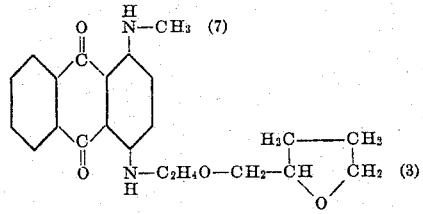

The 7 and 3 mean that the mole ratio of the methylamino group present in the dye mixture to the β-tetrahydrofurfuryloxyethylamino group is substantially 7 to 3. The dye mixture of this example colors cellulose acetate silk blue.

*Example 14*

24 grams of leuco-1,5-dihydroxyanthraquinone, 150 cc. of butanol and 16 grams of β-tetrahydrofurfuryloxyethylamine are heated together under refluxing conditions until no further color change takes place. Upon completion of the reaction which takes place, the reaction mixture is poured into water and oxidized with sodium perborate. The dye compound formed is recovered by filtration, washed with water and dried. 1-mono-β-tetrahydrofurfuryloxyethylamino-5-hydroxyanthraquinone is obtained. This dye compound colors cellulose acetate silk red.

By the use of 32 grams of β-tetrahydrofurfuryloxyethylamine in the above process, 1,5-di(mono-β-tetrahydrofurfuryloxyethylamino)anthraquinone which colors cellulose acetate silk rubine can be obtained.

*Example 15*

27 grams of leuco-1,4,5,8-tetraaminoanthraquinone, 200 cc. of pyradine and 20 grams of β-furfuryloxy-β-ethoxyethylamine are heated together under refluxing conditions until no further color change takes place. Upon working up the reaction mixture, 1-mono-β-furfuryloxy-β-ethoxyethylamino-4,5,8-triaminoanthraquinone which colors cellulose acetate silk blue-green is obtained.

*Example 16*

33 grams of leuco-1,4,5,8-tetramethoxyanthraquinone, 150 cc. of butanol and 20 grams of 5-β- hydroxyethyl-β-tetrahydrofurfuryloxyethylamine are refluxed together until no further color change takes place. Upon working up the reaction mixture, 1-mono-β-hydroxyethyl-β-tetrahydrofurfuryloxyethylamino - 4,5,8-trimethoxyanthraquinone which colors cellulose acetate silk blue-green is obtained.

Example 17

24.2 grams of leuco α-chloranthraquinone is reacted with 18 grams of γ-tetrahydrofurfuryloxypropylamine until no further color change takes place. Upon oxidizing and working up the reaction mixture, 1-mono-γ-tetrahydrofurfuryloxypropylaminoanthraquinone which colors cellulose acetate silk blue-green is obtained.

Example 18

24 grams of leuco quinizarin, 16 grams of β-tetrahydrofurfuryloxyethylamine, 13.8 grams of β-phenoxyethylamine and 150 cc. of butanol are refluxed together until no further color change takes place. Upon oxidizing and working up the reaction mixture, 1-mono-β-phenoxyethylamino-4-mono-β-tetrahydrofurfuryloxyethyl-aminoanthraquinone which colors cellulose acetate silk blue is obtained.

Example 19

25.8 grams of leuco-1,4,5-trihydroxyanthraquinone and 32 grams of β-tetrahydrofurfuryloxyethylamine and 150 cc. of butanol are refluxed together until no further color change takes place. 13.8 grams of β-phenoxyethylamine are then added to the reaction mixture and refluxing is continued until no further color change takes place. Upon oxidizing and working up the reaction mixture 1,4-di(monotetrahydrofurfuryloxyethylamino) - 5 - β -phenoxyethylaminoanthraquinone which colors cellulose acetate silk greenish-blue is obtained.

By the substitution of an equivalent gram molecular weight of cyclohexylamine and benzylamine for the β-phenoxyethylamine of the above example, compounds in which the β-phenoxyethylamino group is replaced by a cyclohexylamino and a benzylamino group, respectively, can be obtained. These compounds color cellulose acetate silk greenish-blue.

Example 20

To a mixture of 1.94 grams of leuco quinizarin, 3.35 grams of 86% quinizarin and 0.35 gram of sodium bicarbonate was added a mixture of 2.31 grams of β - tetrahydrofurfuryloxy - β - ethoxyethylamine and 3.12 grams of 33.3% methylamine in 20 cc. of butanol. The reactants were refluxed 9 hours following which the leuco anthraquinone mixture formed was oxidized by adding a mixture of 3 cc. of H₂O and 1.85 grams of NaBO₃—4H₂O portionwise to the hot mixture and refluxed with shaking for one hour. Following this the reaction mixture was poured into 1½ liters of hot water, stirred and the precipitated dye mixture was recovered by filtration, washed with water and dried. The anthraquinone dye mixture has an overall composition corresponding to the formula:

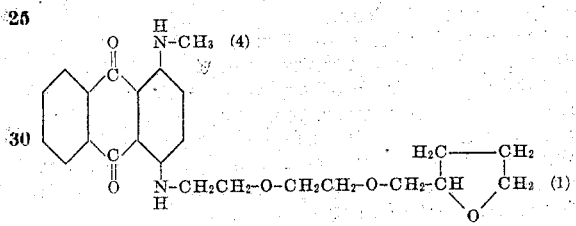

wherein the 4 and the 1 mean that the mole ratio of the methylamino group present in the dye mixture to the β-tetrahydrofurfuryloxy-β-ethoxyethylamino group is substantially 4 to 1. This dye mixture colors cellulose acetate silk blue.

The following tabulation further illustrates the compounds of our invention together with the color they yield on cellulose acetate silk. From the teachings of this application, the preparation of the compounds disclosed hereinafter will be apparent to those skilled in the art.

| Compound | Color |
|---|---|
| 1,4-di-(mono-β-tetrahydrofurfuryloxyethylamino)-2-cyano-anthraquinone | Blue. |
| 1-mono-β-phenoxyethylamino-2-carboxylic-4-hydroxyanthraquinone | Violet. |
| 1-mono-β-tetrahydrofurfuryloxy-β-ethoxyethylamino-2,3-dichloro-4-hydroxy-anthraquinone | Rubine. |
| 1-mono-β-furfuryloxyethylamino-2-carboxamide-4-mono-γ-hydroxypropylamino-anthraquinone | Blue. |
| 1-mono-β-tetrahydrofurfuryloxyethylamino-2-hydroxy-4-mono-β-methoxyethylamino-anthraquinone | Do. |
| 1-mono-β-(4'-methylphenoxy)-ethylamino-2-sulfonic-4-mono-β-hydroxypropylamino-anthraquinone | Do. |
| 1-mono-β-tetrahydrofurfuryloxyethylamino-4-monoethylamino-5-hydroxy-anthraquinone | Greenish-blue. |
| 1,4-di-(mono-N(H)-CH₂-CH(CH₃)-O-⟨phenyl⟩)-anthraquinone | Blue. |
| 1-mono-N(CH₃)-CH₂-CH₂-O-tetrahydrofurfuryl-4-mono- | Greenish-blue. |
| β-hydroxyethylamino-5,8-dihydroxy-anthraquinone | Violet. |
| 1-mono-β-tetrahydrofurfuryloxyethylamino-4-ethylamino-5-hydroxy-anthraquinone | Greenish-blue. |
| 1-mono-N(H)-CH₂-CH(CH₃)-O-CH₂-CH(CH₃)-O-CH₂-CH(CH₃)-O-⟨phenyl⟩-4-mono-allylamino-5-amino-8-hydroxy-anthraquinone | Do. |
| 1-mono-β-tetrahydrofurfuryloxyethylamino-4-amino-anthraquinone | Reddish-blue. |
| 1-mono-β-phenoxyethylamino-4-hydroxy-anthraquinone | Violet. |
| 1-mono-N(H)-CH₂-CH(CH₃)-CH₂-OCH₂-CH(tetrahydrofuryl)-4,8-dihydroxy-5-amino-anthraquinone | Do. |
| 1-mono-β-(4'-hydroxyphenoxy)-ethylamino-4-amino-anthraquinone | Blue. |
| 1-mono-β-(4'-dimethylaminophenoxy)-ethylamino-4-amino-anthraquinone | Do. |
| 1-mono-β-furfuryloxyethylamino-4-mono-butylamino-anthraquinone | Do. |
| 1-mono-β-phenoxyethylamino-4-mono-β-hydroxyethylamino-anthraquinone | Do. |

In order that the manufacture of the anthraquinone compounds of our invention may be entirely clear, the preparation of the amines having the formula:

$$H_2N—(X—O)_n—R$$

wherein X, n and R have the meaning previously assigned to them is disclosed hereinafter.

Amines of the above formula can be prepared by aminating alcohols of the formula:

$$HO—(X—O)_n—R$$

wherein X, n and R have the meaning previously assigned to them. Amination can be carried out in either the liquid or vapor phase in the presence of a suitable catalyst. Catalysts that can be employed include finely divided metallic oxides, reduced metals, silicates, phosphates such as phosphoric acid on pumice, activated charcoal and nickel from an alloy. By this type of nickel catalyst we refer to one wherein an alloy of nickel such as nickel aluminum or nickel silicon is treated with an alkali hydroxide or other solvent for the aluminum and/or silicon, thereby giving a finely divided nickel.

The reaction may be carried out at temperatures generally ranging between 160°–350° C. although for optimum results it has been found that in many instances the temperature preferably should be maintained within 200°–250° C. Reaction in the liquid phase may be carried out under some pressure in a closed vessel equipped for shaking or stirring.

When amination is carried out in the vapor phase, the products of reaction are condensed, passed through a suitable still and any unreacted alcohol recovered, mixed with ammonia and returned to the reaction vessel.

The formation of secondary and tertiary amines can, in part, be controlled by the reaction proportions employed. Use of an excess of ammonia, decreased temperatures and decreased time of contact favors the formation of the desired primary amine as opposed to the secondary and tertiary amines. For a more complete description of the amination process which can be employed, reference may be had to Dickey and Gray application Serial No. 263,525, filed March 22, 1939.

Alcohols of the formula:

$$HO—(X—O)_n—R$$

wherein X and n have the meaning previously assigned to them and R is a tetrahydrofurfuryl group can be prepared in accordance with the process described in Dickey U. S. Patent No. 2,196,748, issued April 9, 1940. Alcohols of the above formula wherein R is a phenyl or furfuryl group can be prepared by substituting a phenol or a furfurylalcohol for the tertahydrofurfuryl alcohol of said patent and carrying out the process in the manner described.

The anthraquinone compounds of our invention are, for the most part, relatively insoluble in water and, accordingly, they may be advantageously directly applied to the material in the form of an aqueous suspension which can be prepared by grinding the dye to a paste in the presence of a sulfonated oil, soap or other suitable dispersing agent and dispersing the resulting paste in water.

Direct dyeing operations can, with advantage, be conducted at temperatures of about 75–85° C. but any suitable temperature may be used. Thus the material to be dyed or colored is ordinarily added to the dyebath at a temperature lower than that at which the main portion of the dyeing is to be effected, a temperature approximating 45°–55° C., for example, following which the temperature is raised to that selected for carrying out the dyeing operation. The temperature at which the dyeing is conducted may, of course, be varied somewhat depending on the particular material undergoing coloration. As is understood by those skilled in the art, the intensity of dyeing can be varied by varying the proportion of dye to material undergoing coloration. Generally speaking 1–3% by weight of dye to material is employed, although any desired proportions can be used.

The amount of dispersing agent employed may be varied over wide limits. Amounts approximating 10 to 200% by weight of the dye may be employed, for example. These amounts are not to be taken as limits as greater or lesser amounts can be used. To illustrate, if the dye is ground to a sufficiently fine powder, dyeing can be satisfactorily carried out without the aid of a dispersing agent. Again, in certain instances, the dye may possess sufficient solubility in water as to render the use of dispersing agent unnecessary. Generally speaking, however, the use of a dispersing agent is desirable.

The anthraquinone compounds of our invention may be applied to the material to be colored in any suitable manner. Coloration may be effected, for example, by dyeing, printing or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

The following example illustrates how cellulose acetate silk may be dyed in accordance with our invention. Quantities are expressed in parts by weight.

*Example A*

2 parts of the dye mixture of Example 13 are finely ground with a dispersing agent such as soap or oleyl glyceryl sulfate and the resulting paste is dispersed in 1000 parts of water. The dispersion thus prepared is heated to a temperature approximately 45–55° C. and 100 parts of cellulose acetate silk in the form of yarn or fabric, for example, are added to the dyebath after which the temperature is gradually raised to 75–85° C. and the silk worked for several hours at this latter temperature. Sodium chloride may be added, as desired, during the dyeing operation to promote exhaustion of the dyebath. Upon completion of the dyeing operation, the cellulose acetate silk is removed, washed with soap, rinsed and dried. The cellulose acetate silk is colored a blue shade of good fastness to light.

While our invention has been illustrated in connection with the dyeing of cellulose acetate silk, it will be understood that the other materials named herein can be substituted for the cellulose acetate silk of the above example and the dyeing operation carried out in the manner described. Again, while colors yielded by the dye compounds have been given with reference to collulose acetate silk, ordinarily generally similar colors are obtained on the other materials.

We claim:
1. The anthraquinone compound having the formula:

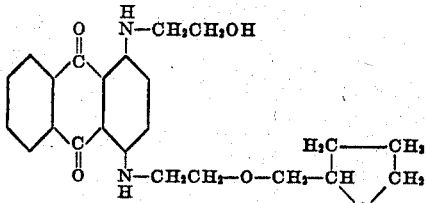

2. The anthraquinone compounds having a single anthraquinone nucleus containing in the α-position a group of the following formula:

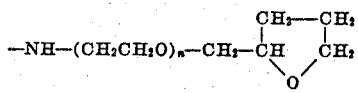

wherein $n$ represents a positive integer of from 1 to 2.

3. The anthraquinone compounds having the following general formula:

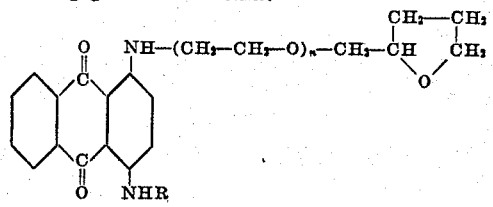

wherein $n$ represents an integer of from 1 to 2, and R represents an alkyl group.

4. The anthraquinone compounds having the following general formula:

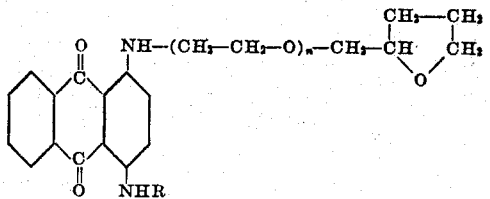

wherein R represents a hydroxyalkyl group.

5. The anthraquinone compounds having the following general formula:

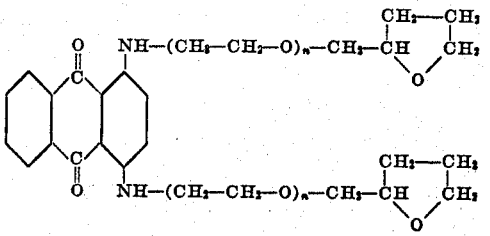

wherein $n$ represents a positive integer of from 1 to 2.

6. An anthraquinone compound of the following formula:

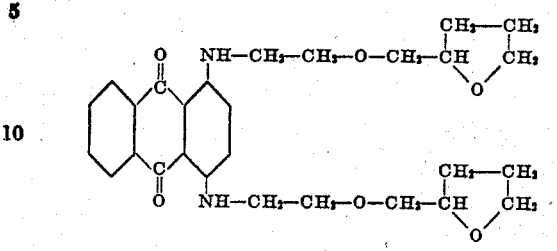

7. An anthraquinone compound of the following formula:

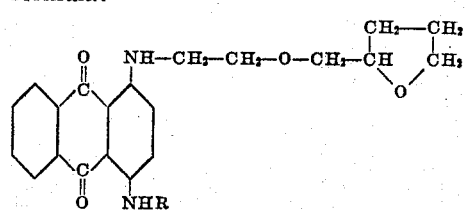

wherein R represents an alkyl group.

8. The anthraquinone compounds having the following formula:

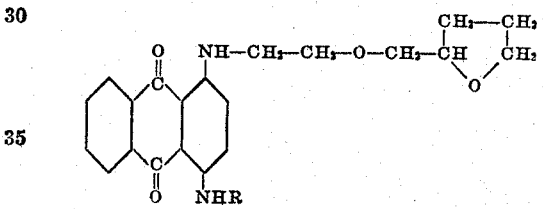

wherein R represents a hydroxyalkyl group.

9. The anthraquinone compound having the following formula:

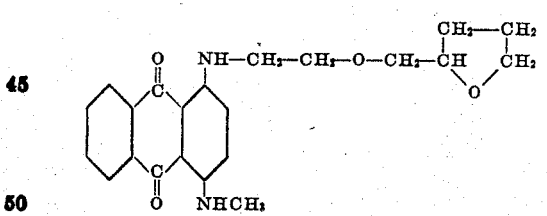

JOSEPH B. DICKEY.
JAMES G. McNALLY.